United States Patent [19]

Maloof

[11] 4,373,241
[45] Feb. 15, 1983

[54] METHOD OF MAKING PROPELLER BLADE

[76] Inventor: Ralph P. Maloof, 4527 Park Monaco, Calabasa, Calif. 91302

[21] Appl. No.: 144,389

[22] Filed: Apr. 28, 1980

Related U.S. Application Data

[63] Continuation of Ser. No. 805,283, Jun. 10, 1977, Pat. No. 4,202,655.

[51] Int. Cl.³ .............. B23P 15/02; B21C 23/16
[52] U.S. Cl. .............. 29/156.8 P; 29/156.8 B; 29/558; 72/256; 72/299
[58] Field of Search .............. 29/156.8 P, 156.8 B, 29/558; 416/237, 237 A, 234, 239, 243, 248, 223; 72/299, 256

[56] References Cited

U.S. PATENT DOCUMENTS

| | | | |
|---|---|---|---|
| 1,068,946 | 7/1913 | Taylor | 416/237 |
| 1,368,747 | 2/1921 | Pattosien | 416/237 |
| 1,471,590 | 10/1923 | Carter | 416/223 |
| 1,682,398 | 8/1928 | Mitchell | 72/256 |
| 1,909,097 | 5/1933 | Damerell | 29/156.8 P |
| 1,968,918 | 8/1934 | Toth | 416/237 |
| 2,083,993 | 6/1937 | Hall | 416/237 |
| 2,161,444 | 6/1939 | Albers | 416/237 |
| 2,236,494 | 3/1941 | Albers | 416/223 |
| 2,255,920 | 9/1941 | Englesson | 416/157 R |
| 2,304,153 | 12/1942 | Di Cesare | 416/157 R |
| 2,345,047 | 3/1944 | Houghton | 416/223 |
| 2,352,442 | 6/1944 | Loewy et al. | 72/299 |
| 2,843,919 | 7/1958 | Garaventa et al. | 29/156.8 P |
| 2,880,496 | 4/1959 | Benedict et al. | 29/156.8 R |
| 2,938,585 | 5/1960 | Fanti | 416/243 |
| 3,119,453 | 1/1964 | Haig, Jr. | 416/239 |
| 3,200,477 | 8/1965 | Shultz | 29/156.8 H |
| 3,239,011 | 3/1966 | Brownlee | 416/239 |

FOREIGN PATENT DOCUMENTS

| | | |
|---|---|---|
| 1113386 | 8/1961 | Fed. Rep. of Germany ...... 416/237 |
| 2626304 | 12/1976 | Fed. Rep. of Germany ...... 416/237 |
| 632409 | 11/1949 | United Kingdom ................ 72/299 |

*Primary Examiner*—Daniel C. Crane
*Attorney, Agent, or Firm*—William H. Maxwell

[57] ABSTRACT

The method of making a propeller and fan blading comprised of an extruded airfoil having a rib retained at the root for mounting and with a portion thereof removed by flattening the back of the blade truncating the back camber thereof in a plane tapered toward the blade tip with respect to the front camber thereof and having a flap of full configuration toward the root of the blade and continuing tangent from the front camber and extending angularly back from the back camber and reduced toward the blade tip by profiling the trailing edge made thin toward said tip by a flattening truncating the back trailing portion of the blade toward said tip.

27 Claims, 18 Drawing Figures

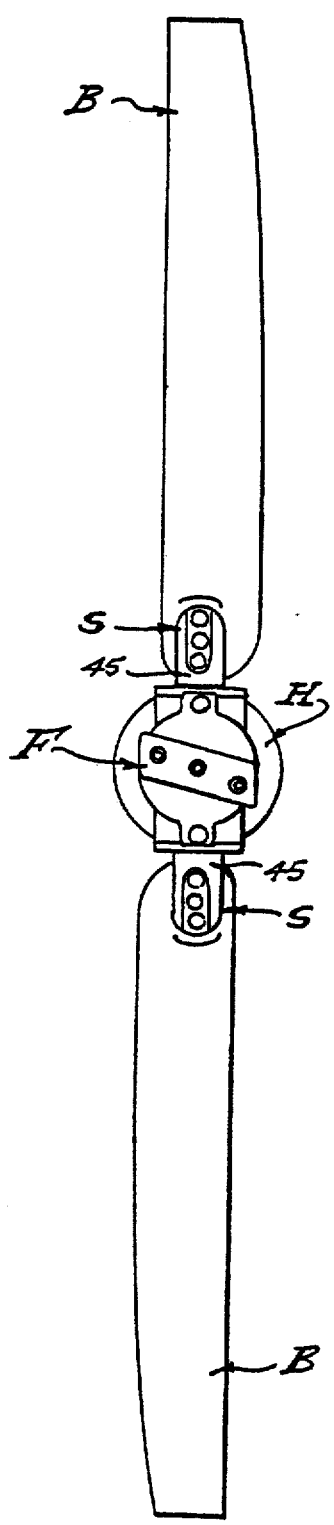
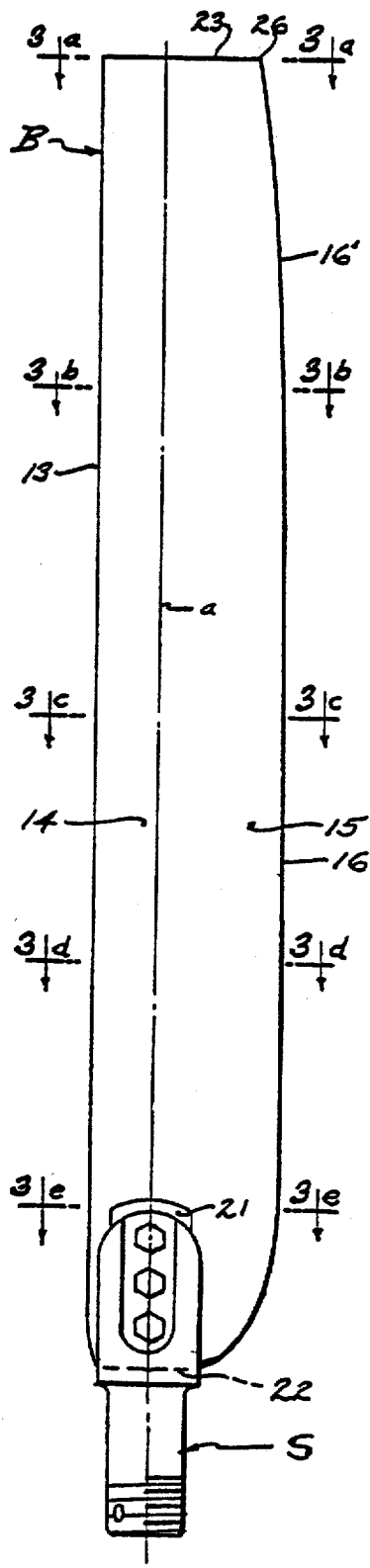
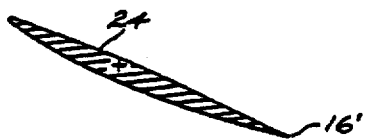

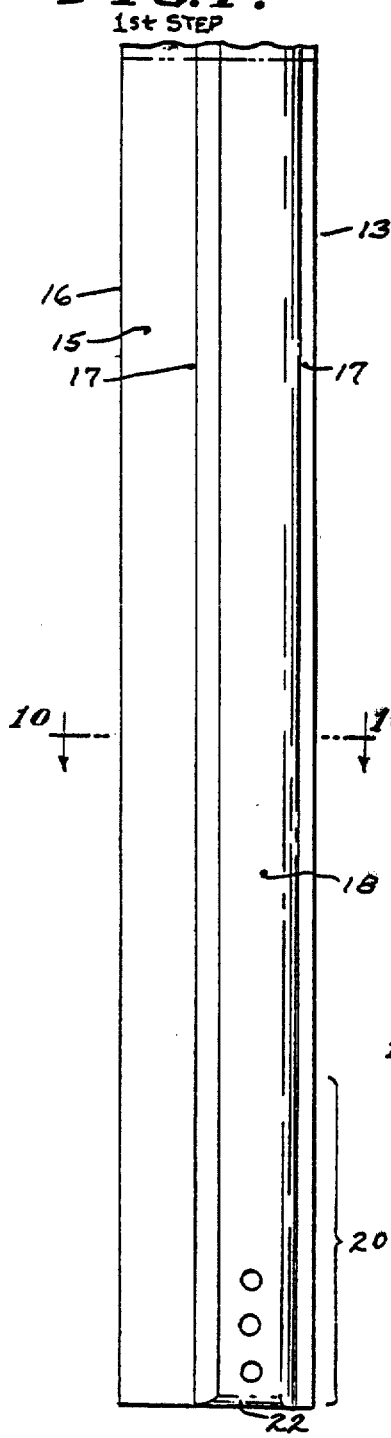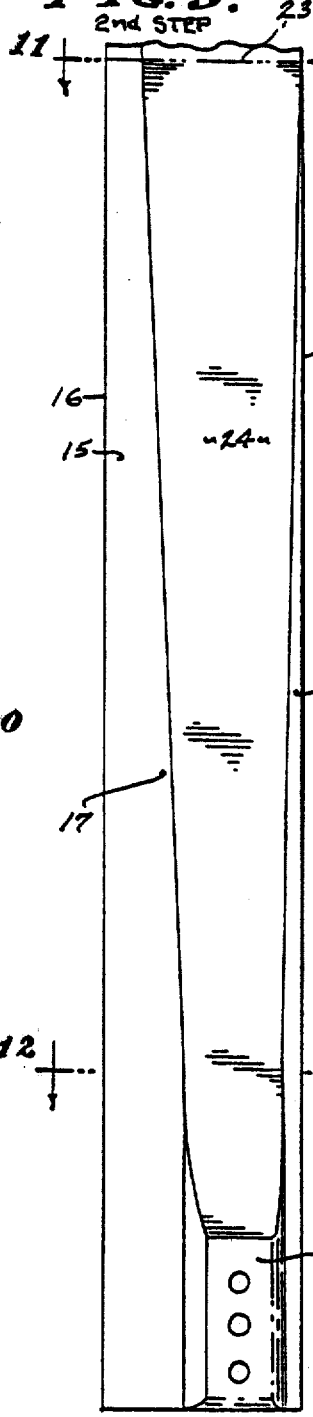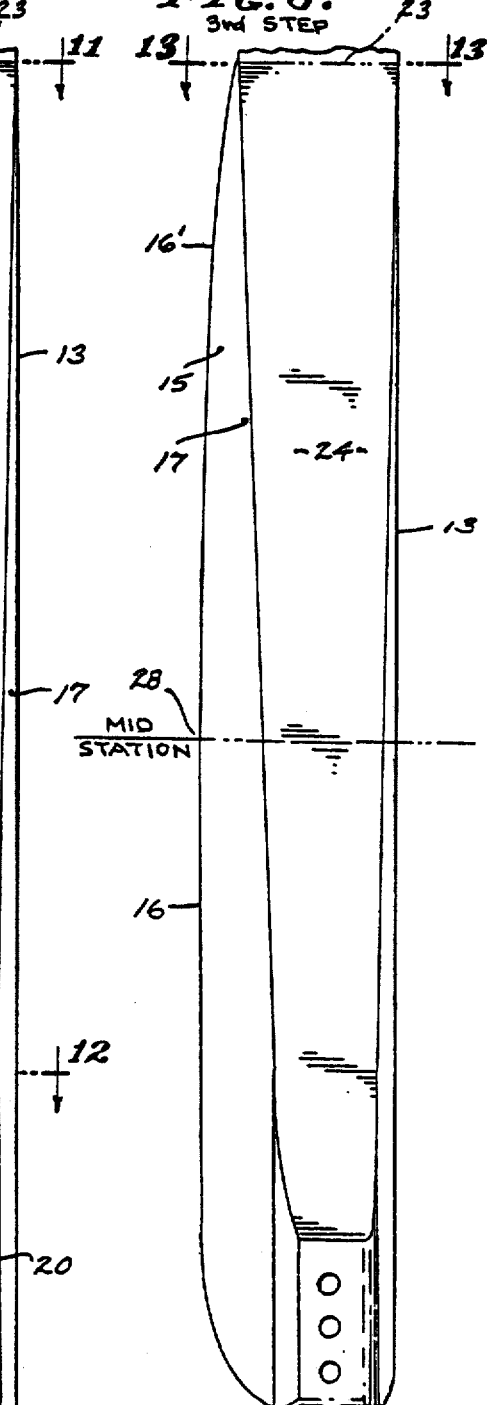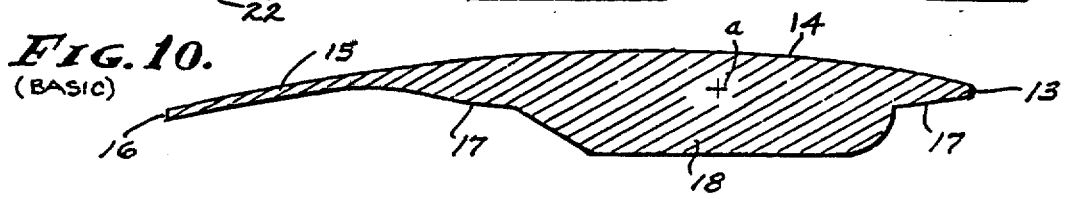

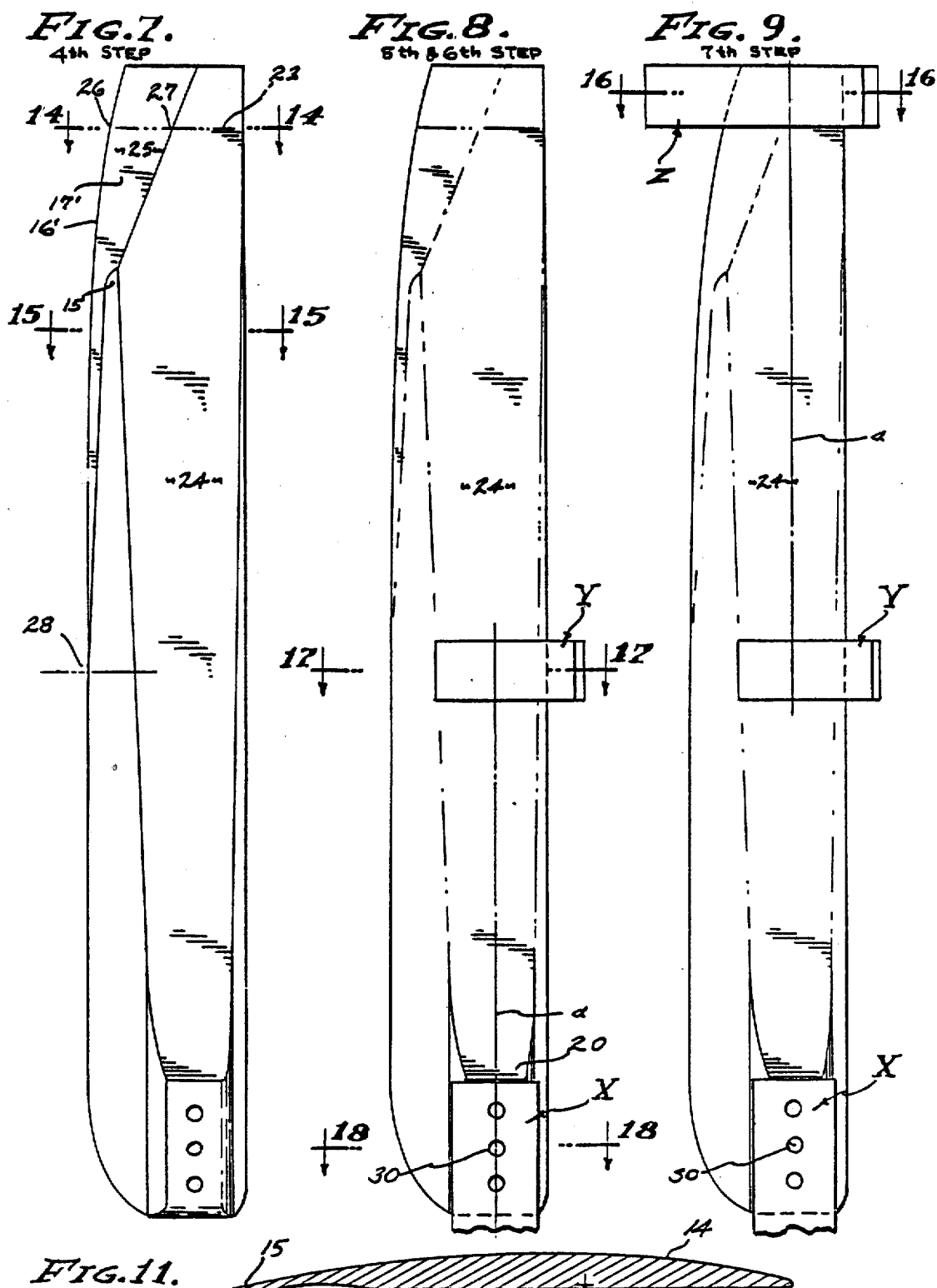

FIG. 13.
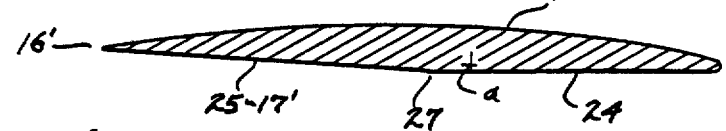
FIG. 14.
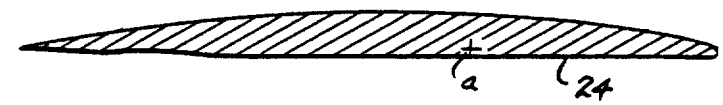
FIG. 15.
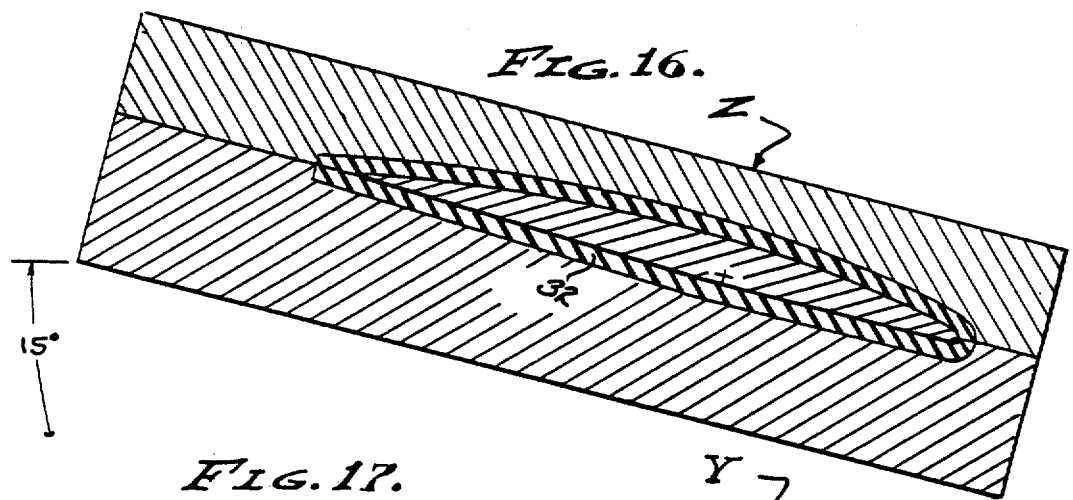
FIG. 16.
FIG. 17.
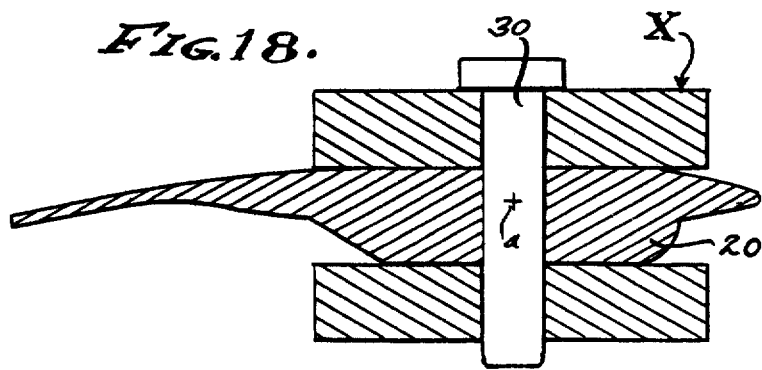
FIG. 18.

METHOD OF MAKING PROPELLER BLADE

REFERENCE TO EARLIER APPLICATION

This application is continuation of application Ser. No. 805,283, filed June 10, 1977 and entitled PROPELLER FOR BLADING AND HUB THEREFOR and issued May 13, 1980 as U.S. Pat. No. 4,202,655; and is copending with application Ser. No. 144,390 filed Apr. 28, 1980 on even date herewith and entitled VARIABLE PITCH PROPELLER HUB WITH FLUID MOTOR ACTUATING MEANS.

BACKGROUND

The construction of propeller blades for aeroplanes and for the propulsion of air in general is costly when high performance is a requirement; with the involvement of laminated wood and glass fiber encasements or the use of complex castings and machined metal forgings therefor. The number of blades will vary from two to three or four and more, it being common practice to provide air circulation fans with a plurality of blades greatly in excess of the pair of or several blades which characterize the propellers of small aircraft, for example. Heretofore, resort has been made to the use of extrusions in the formation of propeller blade cross sections, in place of the characteristic screw shaped wooden or metallic blades that vary in cross section from root to tip. However, the uniform cross section which has characterized extruded propeller blades has not been conducive to ultimate efficiency, and to this end it is an object of this invention to provide the economy of extruded blading with the efficiency of sophisticated blade design having optimum pitch and cross sectional configuration varying from root to tip, as may be requred. In practice, the circular speed of the propeller blade cross section increases from root to tip, being subsonic toward the root and often supersonic toward the tip. Consequently, efficiency must be achieved by means of increased pitch toward the root, and conversely by means of decreased pitch toward the tip in order to preclude high speed stall, and further by means of progressively higher speed blade cross sections toward the tip. These advantages are attained with the present invention.

Sophisticated propeller blading combines the aforementioned features relating to aerodynamic requirements and structural requirements as well. Accordingly, propeller blades are tapered commensurate with the stresses to be encountered thereby, and consequently are of thicker cross section toward the root and of thinner cross section toward the tip. Heretofore, extruded propeller blading has not been conducive to a tapered configuration, however it is an object of this invention to taper extruded propeller blading for the combined purposes of advantageously varying the aerodynamics of its cross section from root to tip and of reducing its strength from root to tip. With the present invention, optimum aerodynamics and strength is realized.

The material substance of propeller blading and mode of manufacture is of great concern, since the laminate, cast and forged structures of the accepted prior art blading are very expensive and vulnerable to damage beyond repair; for instance, with the slightest damage an aircraft propeller is no longer airworthy, and to this end it is an object of this invention to provide a material substance and its formation which is the least vulnerable to damage and which inherently meets the requirements of airworthiness; and which in the event of damage is replaceable at a minimum of cost. With the present invention, an aluminum alloy extrusion is used in preference to a wood laminate, cast or forged aluminum member, at great savings in cost of material and working required to fabricate the same. As will be described, the mass of the propeller blade is minimized in the wrought cross section that varies in both shape and pitch from root to tip. As a result, there is root stiffness and tip flexibility, and all of which is replaceable on a mounting stem.

Heretofore, extruded propeller blading has been restricted to the straightened and uniform cross section of its basic form, and inherently inefficient for lack of sophistication, as pointed out above. Attempts have been made in the past to twist extruded blades, but unsuccessfully for lack of uniformity in the progressive variation of pitch related to cross section. It is an object therefore, of this invention to provide a method that is simple and practical by which a uniform and predictable variation in pitch from root to tip is successfully obtained, after a minimum amount of machining is performed so as to establish constant varying optimum cross sectional configurations. With the method hereinafter disclosed, the blade is twisted progressively by means of simultaneously applying twisting forces both above and below the elastic limit of the malleable material substance forming the blade.

The higher as compared with lower velocity airfoils vary greatly from root to tip of propeller blades, with respect to length of chord the front and back cambers, and the helical pitch. Further, fineness or depth of the airfoil diminishes progressively toward the tip; the front camber being convex throughout the blade length, and the back camber being concaved toward the root and flattened toward the tip. Therefore, it is an object to include these advantageous features in an extruded airfoil for propeller blading, by extruding a basic airfoil configuration that presents a useable front camber configuration, and a rear configuration that is partially removed so as to provide a flattened back camber that retains a convexely narrowing leading edge, a concaved trailing edge toward the root, and a convex trailing edge toward the tip. With the present invention, extrusion modification is by machining at the rear side thereof, truncation thereof to reduce chord length toward the tip being coordinated with back side reduction so as to control and establish thinness at the trailing edge. The removal of material substance at the back of the blade precedes the aforementioned progressive twisting into helical form.

SUMMARY OF INVENTION

This invention relates to propellers and fan blading and especially to those used in light aircraft and powered sail planes. A feature herein is the employment of an extrusion as the basic cross sectional configuration of the propeller blade airfoil, and all of which is accomplished by the discriminate removal of material at the rear of the extruded blade to establish the variable camber configuration progressing from a low velocity airfoil toward the root of the blade and to high velocity airfoil toward the tip of the blade. Conjointly with the said cross sectional variations, the blade is controllably twisted after machining and into its final and permanent formation by means of torsion applied discriminately at various radial stations therealong, and to the end that pitch is uniformly decreased toward the tip despite the tapering cross sectional configuration, all as hereinafter described.

The foregoing and other various objects and features of this invention will be apparent and fully understood from the following detailed description the typical preferred form and applications thereof, throughout which description reference is made to the accompanying drawings.

DESCRIPTION OF THE DRAWINGS

FIG. 1 is a front view of the propeller blades carried by a hub.

FIG. 2 is an enlarged front view of one blade removed from the assembly of FIG. 1.

FIGS. 3a through 3e inclusive are enlarged sectional views through the blade taken as indicated by lines 3a—3a through 3e—3e on FIG. 2 respectively.

FIGS. 4 through 9 are back views of the propeller blade showing the consecutive process steps involved in making the same respectively.

FIG. 10 represents the first step of the process and is an enlarged sectional view of the basic extrusion employed herein and taken as indicated by line 10—10 on FIG. 4.

FIGS. 11 and 12 are enlarged sectional view resulting from the second step of the process and taken as indicated by lines 11—11 and 12—12 on FIG. 5.

FIG. 13 is an enlarged sectional view resulting from the third step of the process and taken as indicated by line 13—13 on FIG. 6.

FIGS. 14 and 15 are enlarged sectional views resulting from the fourth step of the process and taken as indicated by lines 14—14 and 15—15 on FIG. 7.

FIG. 16 is an enlarged sectional view illustrating the seventh step of the process and taken as indicated by line 16—16 on FIG. 9. And FIGS. 17 and 18 are enlarged sectional views illustrating the sixth step of the process and taken as indicated by lines 17—17 and 18—18 on FIG. 8.

PREFERRED EMBODIMENT

Referring now to the drawings, the propeller blades B are mono-form members replaceably fastened to a revolving stem S carried on radial axes respectively. The propeller shown is two bladed in which case the axes are coaxially disposed through a hub housing H to intersect the rotational axis thereof and all of which is secured to the engine drive flange by screw fastener (not shown).

The propeller blade B is a wrought mono-form of aluminum alloy such as for example 2024 aluminum in the fully heat treated T4 condition, extruded into the basic cross sectional configuration shown in FIGS. 4 and 10. As shown, the basic cross section is comprised of an eliptical leading edge 13 that fairs into a convex front camber 14 that constitutes approximately 80% of the chord and which tangentially continues into a flap 15 terminating in a thin trailing edge 16, and a convex back camber 17 that also constitutes approximately 80% of the chord and which concavely continues into said flap 15. The 20% extension of the flap 15 is slightly curvilinear and of uniform minimal thickness and extends angularly and substantially rearward of said back camber 17. Thus, the basic airfoil is lenticular and characterized by the angularly extending flap 15 that determines the nominal thickness of the trailing edge 16. The center of effort of the completed blade will extend along an axis approximately 40% rearward of the leading edge at the root of the blade and parallel therewith. Therefore, centered 40% rearward of the leading edge there is a mounting rib 18 that constitutes approximately 50% of the chord and projects from the back camber 17 to substantially double the blade thickness. Thus, in the basic extrusion the rib 18 covers approximately half of the back camber 17, as shown in FIG. 10, this extrusion being in its straightened and heat treated form of parallel uniform cross section, cut to length somewhat in excess of the finished blade to be described.

The first step of processing the basic extrusion provides the propeller blade B with a mounting boss 20 at its root end (see FIGS. 4 and 10). As shown, the boss 20 extends longitudinally and is comprised of the root portion of the rib 18 machined flat and parallel with respect to a complementary face 21 machined into the front camber 14. The butt 22 of the blade is a half-round radius centered on and disposed normal to the axial longitudinal center of effort of the blade, there being several fastener openings therealong to secure the blade boss in shear to a stem latter described.

The second step of processing the blade extrusion provides the characteristic flattened back camber 17 that extends from the root boss 20 to the blade tip 23 (see FIGS. 5, 11 and 12). It is preferred that this second step precede the later described fourth step, a feature of the propeller blade B being its taper in thickness from the root to tip while maintaining leading and trailing portions of the back camber 17 that extend from the leading edge 13 and to the flap 15. As shown, a first flat face 24 is machined into the back side of the basic extrusion, to extend angularly with respect to the front camber 14 from the maximum airfoil thickness at the boss 20 to the minimum airfoil thickness at the tip 23. A structural taper is provided from the boss 20 to a radially positioned station of maximum airfoil cross section, in the form of a concaved fillet fairing into the flat face 24 and preferably an eliptical fillet as shown. Characteristically therefore, the flat face 24 commences at a radial station removed longitudinally from the boss 20 and where the rib 18 is fully truncated and said face 24 tangent with both the leading portion and trailing portion of camber 17, as shown. The degree of taper is determined by extending the flat face 24 to the tip 23 where it meets tangentially with both the convexity of the leading edge 13 and the concavity continuing into the flap 15. It is to be understood that tangency at the leading edge 13 may be imperfect, inasmuch as the front and back cambers 14 and 17 are joined eliptically by said leading edge. A feature, therefore, is the progressively gradual truncation of the leading and trailing surfaces of back camber 17 between the leading edge 13 and flap 15, and characterized by the complete removal of camber 17 at the tip 23.

The third step of processing the blade extrusion provides the blade profile with a reduction of chord toward the tip 23 (see FIGS. 6 and 13). A feature of the blade profile is the straight unaltered leading edge 13 and the arcuate forwardly curved trailing edge 16' machined from the full chord mid station (see FIG. 6) to the tip 23. It will be observed that the trailing edge 16' will remain of uniform thickness due to the uniform thickness of the flap 15 extending rearward from its concaved fairing into the camber 17. In practice, the entire flap 15 is removed at the tip 23 by the forwardly curved trailing edge which thicknes as it encroaches upon the concaved fairing, to be made thin as next described.

The fourth step of processing the blade extrusion provides thinness of trailing edge 16' and provides back camber 17' toward the tip 23 (see FIGS. 7,14 and 15). More specifically, the trailing edge 16' is tapered from a mid station of the blade B to the tip 23 where it is of minimal thickness, by machining a second flat face 25 of triangular plan form that extends between the trailing tip 26 to a point 27 at approximately 50% of the tip chord, and to an apex 28 at said mid station along the blade. Thus, a small amount of camber 17' is applied to the back side of the airfoil, progressing outwardly from the tangency station of the first mentioned flat face 24 with the concaved fairing of flap 15.

The fifth step of processing the blade extrusion provides a smooth transition of surfaces at the back side of the propeller blade B (see FIG. 8). In carrying out the foregoing steps, all ridges formed by surface intersections are obtuse and/or practically imperceptible. However, where ridge definition is perceptible, polishing with light abrasive is sufficient to remove sharpness commensurate with efficiency requirements and which simultaneously removes any machine tool markings.

The sixth step of processing the machined blade extrusion thus far described provides the stress conditions prerequisite for the seventh and final step of this propeller blade fabrication (see FIGS. 8,17 and 18). In accordance with this invention, the root boss 20 is fixed into a clamp or clevis X simulating the stem fitting of the propeller hub latter described, and aligned with an axis a disposed coincidental with the axial center of the blade B to be formed. And, at least one station between the root and tip of the machined extrusion is revolved in the direction of helical twist positioning the chord of said station at a pre-determined angle as related to the chord at the root station of the extrusion. In practice, the clamp X embraces the root boss 20 and with drive pins 30 that rotatively positions the blade section when torque is applied to a remote station, namely any intermediate station or the endmost station at the tip of the blade. In carrying out the invention, the tip station can be initially revolved and held positioned by means of applying torque not to exceed the elastic limit, followed by positioning and torque applied at an intermediate blade station. Or as shown in FIG. 8 torque can be initially applied to an intermediate station by a rotatable chuck or calliper Y, as next described. That is, a station is initially revolved and held positioned by means of applying torque not to exceed the elastic limit to be followed by the application of torque exceeding the elastic limit at other blade stations.

It will be seen that the machined blade extrusion is pre-stressed at one or more stations, as shown by means of at least one encompassing calliper Y or Z disposed on axis a and to which position or torque is applied. For example, the calliper Y embraces the intermediate station cross section within elastomeric facers 31, for example ⅛ inch thick, that yieldingly confine the blade section to be positioned thereby in the direction of helical twist. Or the calliper Y embracing the station cross section can be motivated by a torque drive (not shown) tending to turn the confined blade section in the direction of helical twist, all without exceeding the elastic limit at the said blade section. In practice, a calliper Y is applied at the mid station of the blade extrusion as shown.

The seventh and final step of processing the pre-stressed machined blade extrusion provides the finished propeller blade B shown in FIG. 2 and having all of the aforesaid requirements for efficiency (see FIGS. 9 and 16). Accordingly, the endmost or tip station of the pre-stressed blade extrusion is revolved in the direction of helical twist, angularly positioning the chord of said endmost station at a pre-determined angle as related to the chords at the root and intermediate stations of the extrusion. That is, the said endmost station is revolved to a bending point of the blade extrusion exceeding the elastic limit at said endmost blade station. In practice, the application of controlled torque through several stations is complementary, and to the end that a progressively gradual bending of the blade extrusion occurs without over bending the increasingly reduced and weakened cross sections toward the tip of the blade. As shown, an encompassing chuck Z is disposed on axis a and to which positioning torque is applied. For example, the chuck Z embraces an extension of the tip portion of the extrusion within elastomeric facers 32, for example 1/16 inch thick, that yieldingly pressures and turns the endmost blade station sufficiently beyond the yield point thereof to allow spring-back to return said endmost station to the desired helix angle. By pre-stressing as described above, the torque applied to the endmost station adds to that applied to the at least one intermediate station, and to the end that all stations exceed the elastic limit, respectively, with commensurately controlled degrees of bending. In other words, a variable helix is set into the extruded blade with the decreasing angle thereof disposed according to increased radial displacement, and all without over bending of the higher velocity stations which must be disposed at progressively lesser angles toward the tip for efficient operation. The excess extrusion is then removed so as to establish the finished tip 23, and thereby producing a finished propeller blade B (see FIG. 2).

The propeller blade stems S are alike, preferably identical, and provide a replaceable fitting to carry the replaceable propeller blades B. As shown, the stem S has a clevis 45 that embraces the boss 20 of the blade and secured thereto by shear fasteners extending through the several matched openings therefor.

From the foregoing it will be seen that a commercially practical blade and propeller hub assembly is provided, especially for light aircraft and comparable fan installations. The blades per se are fabricated from readily available material adapted to extrusion and subject to easily performed machine and forming operation, while the hub assembly is compact the parts accessible for maintenance and repair.

Having described only a typical preferred form and applications of my invention, I do not wish to be limited or restricted to the specific details herein set forth, but wish to reserve to myself any modifications or variations that may appear to those skilled in the art.

I claim:

1. A process for producing a mono-form propeller blade, and which includes:

extruding a basic airfoil of straight elongate and uniform configuration to extend from the root to the tip of the propeller blade and to have front and back cambers extending between rounded and thin leading and trailing edges, respectively;

and truncating the back camber to a flat plane extending from the root to the tip of the propeller blade in tapered relation to the said front camber of the extruded airfoil.

2. The process of producing a mono-form propeller blade as set forth in claim 1, wherein the said truncation is extended to the said leading and trailing edges at the tip of the propeller blade thereby eliminating the back camber at said blade tip.

3. The process of producing a mono-form propeller blade as set forth in claim 1, wherein the said truncation at the trailing portion of the propeller blade is subjected to a second truncation toward the tip of the propeller blade to provide a trailing back camber at said blade tip.

4. The process of producing a mono-form propeller blade as set forth in claim 1, wherein the said truncation is extended to the said leading and trailing edges at the tip of the propeller blade, and wherein the said truncation at the trailing portion of the propeller blade is subjected to a second truncation along the trailing edge and toward the tip of the propeller balde to provide a trailing back camber toward said blade tip.

5. The process of producing a mono-form propeller blade as set forth in claim 1, wherein the basic airfoil extrusion is malleable and with the aforesaid features therein is twisted from root to tip of the propeller blade for pitch variation of its airfoil by, fixedly positioning the root of the propeller blade and revolving a remote station of the basic airfoil extrusion into a pre-stressed condition and then revolving an intermediate station of the basic airfoil extrusion into a bent position, whereby progressively gradual twist occurs from root to tip of said blade.

6. The process of producing a mono-form propeller blade as set forth in claim 1, wherein the basic airfoil extrusion is malleable and with the aforesaid features therein is twisted from root to tip of the propeller blade for pitch variation of its airfoil by, fixedly positioning the root of the propeller blade and revolving the tip station of the basic airfoil extrusion into a position not to exceed the elastic limit, revolving an intermediate station of the basic airfoil extrusion into a bent position exceeding the elastic limit, and then revolving the tip station of the basic airfoil extrusion into a bent position exceeding the elastic limit, whereby progressively gradual twist occurs from root to tip of said blade.

7. The process of producing a mono-form propeller blade as set forth in claim 1, wherein the basic airfoil extrusion is malleable and with the aforesaid features therein is twisted from root to tip of the propeller blade for pitch variation of its airfoil by, fixedly positioning the root of the propeller blade and revolving an intermediate station of the basic airfoil extrusion into a position approximating the elastic limit by means of a yieldable embracement, and then revolving the tip station of the basic airfoil extrusion into a bent position adding to said yieldable embracement and exceeding the elastic limit, whereby progressively gradual twist occurs from root to tip of said blade.

8. A process for producing a mono-form propeller blade, and which includes:
  extruding a basic airfoil of straight elongate and uniform configuration to extend from the root to the tip of the propeller blade and to have leading and trailing portions between which a front camber extends and which form parts of the back camber with a mounting rib therebetween:
  and removing said mounting rib to a flat plane between said leading and trailing portions and throughout the aerodynamically active extent of the blade while retaining the same at the root portion thereof for mounting.

9. The process of producing a mono-form propeller blade as set forth in claim 8, wherein the said leading and trailing parts of the back camber are formed to be tangent to the said flat plane by removing the mounting rib from the aerodynamically active extent of the blade.

10. The process of producing a mono-form propeller blade as set forth in claim 8, wherein removal of the mounting rib is by means of truncating the said leading and trailing parts of the back camber from the root portion of the mounting rib to the blade tip in tapered relation with respect to the front camber of the propeller blade.

11. The process of producing a mono-form propeller blade as set forth in claim 8, wherein removal of the mounting rib is by means of eliptical truncation thereof tangent to said flat plane truncating the leading and trailing parts of the back camber from the remaining root portion of the mounting rib to the blade tip in tapered relation with respect to the front camber of the propeller blade.

12. The process of producing a mono-form propeller blade as set forth in claim 8, wherein the leading and trailing parts of the back camber are formed to be tangent to the said flat plane formed by removing the mounting rib, and wherein the removal of the said mounting rib is by means of truncation from a point of tangency with said leading and trailing parts of the back camber to the blade tip in tapered relation with respect to the front camber of the propeller blade.

13. The process of producing a mono-form propeller blade as set forth in claim 8, wherein the leading and trailing parts of the back camber are formed to be tangent to the said flat plane formed by removing the mounting rib, and wherein the removal of the said mounting rib is by means of truncation from a point of tangency with said leading and trailing parts of the back camber to the blade tip in tapered relation with respect to the front camber of the propeller blade.

14. The process of producing a mono-form propeller blade as set forth in claim 8, wherein the leading and trailing parts of the back camber are formed to be tangent to the said flat plane formed by removing the mounting rib, and wherein the removal of the said mounting rib is by means of eliptical truncation thereof tangent to said flat plane truncating said leading and trailing parts of the back camber from said tangency to a point eliminating said back camber parts at the blade tip in tapered relation with respect to the front camber of the propeller blade.

15. The process of producing a mono-form propeller blade as set forth in claim 8, wherein the basic airfoil extrusion is malleable and with the aforesaid features therein is twisted from root to tip of the propeller blade for pitch variation of its airfoil by, fixedly positioning the root of the propeller blade and revolving a remote station of the basic airfoil extrusion into a pre-stressed condition and then revolving an intermediate station of the basic airfoil extrusion into a bent position whereby progressively gradual twist occurs from root to tip of said blade.

16. The process of producing a mono-form propeller blade as set forth in claim 8, wherein the basic airfoil extrusion is malleable and with the aforesaid features therein is twisted from root to tip of the propeller blade for pitch variation of its airfoil by, fixedly positioning the root of the propeller blade and revolving the tip station of the basic airfoil extrusion into a position not to exceed the elastic limit, revolving an intermediate station of the basic airfoil extrusion into a bent position exceeding the elastic limit, and then revolving the tip station of the basic airfoil extrusion into a bent position exceeding the elastic limit, whereby progressively gradual twist occurs from root to tip of said blade.

17. The process of producing a mono-form propeller blade as set forth in claim 8, wherein the basic airfoil extrusion is malleable and with the aforesaid features therein is twisted from root to tip of the propeller blade for pitch variation of its airfoil by, fixedly positioning the root of the propeller blade and revolving an intermediate station of the basic airfoil extrusion into a position approximating the elastic limit by means of a yieldable embracement, and then revolving the tip station of the basic airfoil extrusion into a bent position adding to said yieldable embracement and exceeding the elastic limit, whereby progressively gradual twist occurs from root to tip of said blade.

18. A process for producing a mono-form propeller blade and which includes:
    extruding a basic airfoil of straight elongate and uniform configuration to extend from the root to the tip of the propeller blade to have leading and trailing portions between which a front camber extends and which form spaced parts of the back camber and to have a trailing flap portion continuing tangentially from the front camber and angularly from the trailing part of the back camber;
    and truncating the spaced leading and trailing parts of the back camber from root to tip of the propeller blade in tapered relation to the said front camber of the extruded airfoil.

19. The process of producing a mono-form propeller blade as set forth in claim 18, wherein the said truncation of the spaced leading and trailing parts of the back camber is subjected to a second truncation toward the tip of the propeller blade reducing the trailing flap and providing a trailing back camber at said blade tip.

20. The process of producing a mono-form propeller blade as set forth in claim 18, wherein the trailing flap is extruded of substantially uniform thickness as it extends tangentially from the front camber and depends from the back camber, and wherein the said trailing flap is profiled from its full chord to a reduced chord at the blade tip.

21. The process of producing a mono-form propeller blade as set forth in claim 18, wherein the trailing flap is extruded of substantially uniform thickness as it extends tangentially from the front camber and depends from the back camber, wherein the said trailing flap is profiled from its full chord to a reduced chord at the blade tip, and wherein the said truncation of the spaced leading and trailing parts of the back camber and profiled portion of the trailing flap is subjected to a second truncation toward the tip of the propeller blade to thin the trailing edge toward the blade tip and to provide a trailing back camber at said blade tip.

22. The process of producing a mono-form propeller blade as set forth in claim 18, wherein the said truncation of the spaced leading and trailing parts of the back camber eliminates the same at the tip of the blade.

23. The process of producing a mono-form propeller blade as set forth in claim 18, wherein the trailing flap is extruded of substantially uniform thickness as it extends tangentially from the front camber and extends angularly from the back camber, wherein the said trailing flap is profiled from its full chord to a reduced chord at the blade tip, and wherein the said truncation eliminates the spaced leading and trailing parts of the back camber at the blade tip and is subjected to a second truncation of the profiled portion of the trailing flap and toward the tip of the propeller blade to thin the trailing edge toward the blade tip and to provide a trailing back camber at said blade tip.

24. The process of producing a mono-form propeller blade as set forth in claim 18, wherein the basic airfoil extrusion is malleable and with the aforesaid features therein is twisted from root to tip of the propeller blade for pitch variation of its airfoil by, fixedly positioning the root of the propeller blade and revolving a remote station of the basic airfoil extrusion into a pre-stressed condition and then revolving an intermediate station of the basic airfoil extrusion into a bent position, whereby progressively gradual twist occurs from root to tip of said blade.

25. The process of producing a mono-form propeller blade as set forth in claim 18, wherein the basic airfoil extrusion is malleable and with the aforesaid features therein is twisted from root to tip of the propeller blade for pitch variation of its airfoil by, fixedly positioning the root of the propeller blade and revolving the tip station of the basic airfoil extrusion into a position not to exceed the elastic limit, revolving an intermediate station of the basic airfoil extrusion into a bent position exceeding the elastic limit, and then revolving the tip station of the basic airfoil extrusion into a bent position exceeding the elastic limit, whereby progressively gradual twist occurs from root to tip of said blade.

26. The process of producing a mono-form propeller blade as set forth in claim 18, wherein the basic airfoil extrusion is malleable and with the aforesaid features therein is twisted from root to tip of the propeller blade for pitch variation of its airfoil by, fixedly positioning the root of the propeller blade and revolving an intermediate station of the basic airfoil extrusion into a position approximating the elastic limit by means of a yieldable embracement, and then revolving the tip station of the basic airfoil extrusion into a bent position adding to said yieldable embracement and exceeding the elastic limit, whereby progressively gradual twist occurs from root to tip of said blade.

27. The process of producing a mono-form propeller blade as set forth in claim 8, wherein the leading and trailing parts of the back camber are formed to be tangent to the said flat plane formed by removing the mounting rib, and wherein the removal of the said mounting rib is by means of truncation from a point of tangency with said leading and trailing parts of the back camber to a point eliminating said back camber parts at the blade tip in tapered relation with respect to the front camber of the propeller blade.

* * * * *